March 22, 1966   B. L. GARCIA   3,241,571
TEST PLUG
Filed Feb. 18, 1963
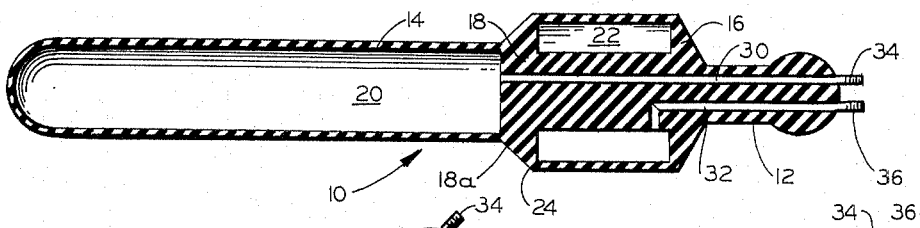
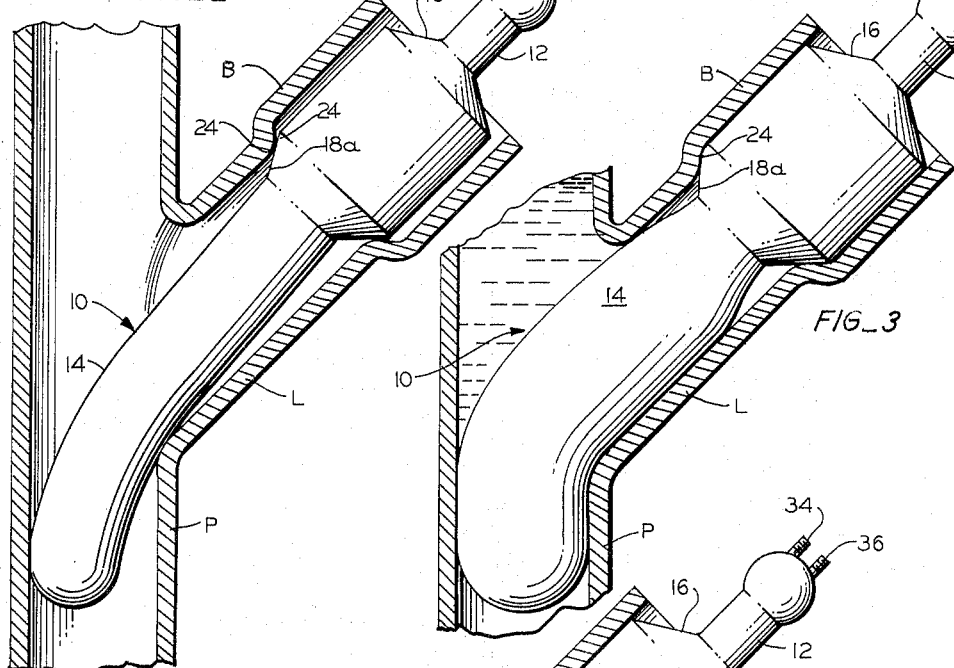
INVENTOR.
BETHUEL L. GARCIA
BY
PATENT AGENT

United States Patent Office 3,241,571
Patented Mar. 22, 1966

3,241,571
TEST PLUG
Bethuel L. Garcia, 1874 Rosswood Drive,
San Jose 24, Calif.
Filed Feb. 18, 1963, Ser. No. 259,336
1 Claim. (Cl. 138—90)

The present invention relates to plugs for sealing fluid conduits, and more particularly, to a dual plug for sealing selectively both sections of connecting conduits such as a Y or T connection.

A principal, though not exclusive, application of the present invention is in the plumbing industry wherein during installation, it is necessary to seal an installed pipe and apply a predetermined fluid pressure to test for possible leakage. More particularly, a vertical run of sewer pipe installed in a building normally has a Y connection adjacent its lower end enabling access for periodic cleaning and also enabling the insertion of a test plug either of a presently-available type or of the type to be described hereinafter. Substantially all of the presently-available types of test plugs would be placed in sealing relationship in the vertical run of pipe above the laterally extending leg of the Y, and it will be obvious that when such plug is loosened after a test, some of the liquid will emerge through the lateral leg or section itself with a resultant possibility of water damage.

Accordingly, it is a general object of the present invention to provide a dual test plug enabling the selective sealing of both sections of a connecting Y or other dual pipe connection.

More particularly, it is a feature of the invention to provide a test plug including two distinct expansible compartments arranged for the establishment of sealing relationship in each of two sections of the dual pipe connection.

It is yet a further feature of the invention to provide a test plug having sufficient flexibility as to permit the sealing of dual connecting pipe sections of various configurations including but not limited to Y connections and T connections.

Yet a further feature of the invention is the provision of a dual test plug incorporating a substantially rigid element dimensioned to preclude excessive insertion of the dual test plug into the pipe, and possible loss thereof.

It is yet a further feature of the invention to provide a test plug incorporating a unitary handle structure which facilitates both insertion and subsequent withdrawal of the test plug from the pipe.

It is an additional feature of the invention to provide a dual test plug which can be readily inserted into the pipe sections and can thereafter be expanded into sealing relationship quickly and simply through the use of a simple hand pump.

Yet a further feature of the invention is the provision of a dual test plug which is relatively simple in construction so that initial cost is nominal and yet which is extremely sturdy so that a long useful life is assured.

These as well as other objects and features of the invention will become more apparent from a perusal of the following description of the exemplary structure illustrated in the accompanying drawing wherein:

FIG. 1 is a central longitudinal sectional view through a test plug embodying the present invention in its inoperative, unexpanded form, FIG. 2 is a view of the unexpanded test plug when initially inserted into a Y pipe connection, FIG. 3 is a view similar to FIG. 2 of the plug after both sections have been expanded, and FIG. 4 is a view similar to FIGS. 2 and 3, but with the innermost section of the test plug deflated to enable drainage of liquids in the one leg of the Y connection.

As illustrated in detail in FIG. 1, the dual test plug has a body 10 of generally prolate or cigar-shaped exterior configuration with a reduced section forming a handle 12 at one extremity thereof.

The main prolate body 10 is formed by a hollow, elongated cup-shaped wall 14 preferably composed of neoprene or other flexible material having a thickness of approximately one-quarter inch so that the body 10 maintains its prolate shape, as illustrated, in the absence of exterior forces, but is capable of flexing to conform to the configuration of a pipe into which it may be inserted, as will be described further hereinafter.

The mentioned handle 12 is formed by a substantially solid, generally cylindrical rod of neoprene, a portion of which projects axially into the open end of the elongated cup-shaped wall 14. A circular flange 16 projects outwardly from the central portion of the cylindrical neoprene rod and is sealed at its periphery to the lip of the cup-shaped wall 14 to form an enclosed chamber. Another circular flange 18 is formed at the inner end of the cylindrical neoprene rod and is also joined at its outer periphery with the neoprene wall so as to form a partition that divides the chamber into two distinct compartments 20, 22. Preferably, this flange 18 is suitably reinforced as indicated at 18a to provide substantially a rigid structure and is formed at its periphery into a frusto-conical configuration so that the attached wall 14 at this position has a generally frusto-conical shoulder 24.

Two flexible tubes 30, 32 are embedded within the handle 12 to provide communication between the two compartments 20, 22 and a source of air under pressure (not shown). More particularly, one tube 30 extends from the compartment 20 axially through the handle 12 to mount a suitable fitting 34 beyond the outer extremity of the handle enabling connection of an air pump thereto and the second tube 32 extends radially inwardly from the compartment 22 to the right of the partition 18 and thence axially through the handle to mount a similar fitting 36 at the extremity of the handle adjacent the first tube 30. The fittings 34, 36 at the end of each tube 30, 32 are of a conventional variety such as utilized on pneumatic tires incorporating a valve mechanism which is normally closed and is opened only upon application of a conventional pump connection thereto.

In its deflated form, as shown in FIG. 1, the diameter of the elongated wall section encompassing the first compartment 20 is slightly less than the diameter of the pipe to be sealed. In turn, the rigid partition at the inner end of the handle effects protrusion of the shoulder 24 to a diameter greater than that of the pipe within which the unit is to be used, but lesser than the bell end of such pipe. Accordingly, when the unit is inserted into a conventional Y pipe connection, the elongated flexible wall portion can pass through the bell end B of the Y opening, thence through the adjoining lateral pipe connection L and into the main pipe P, as illustrated clearly in FIG. 2. The shoulder 24 formed in the wall by the partition 18 comes into abutting engagement with the end of the bell B and precludes further insertion of the unit.

In order to test the pipe, air is supplied through the second tube 32 into the outer compartment 22 which causes expansion thereof into the bell end B of the pipe lateral L to form a seal at this position and additionally to form a secure connection between the test plug and the pipe. Thereafter, air under pressure is supplied to the inner compartment 20 to provide expansion of the neoprene wall 14 into sealing contact both with the lateral pipe L and with the main pipe P at a position below the point of pipe connection, as clearly illustrated in FIG. 3. With both the lateral and the straight pipe sections sealed, water under desired pressure can be supplied to the pipe system to enable the carrying out of leakage tests.

After the tests have been completed, the air within the inner compartment 20 is released to allow deflation of the inner compartment and drainage of the test water through the main pipe P, as shown in FIG. 4, the continued sealing contact of the outer compartment 22 with the bell end B of the lateral pipe section L precluding flow of the water through such lateral pipe section of the Y. When drainage is complete, the air may be released from the outer compartment 22 and the entire unit withdrawn by the simple grasping of the handle 12 and but a slight manual pulling thereon.

It is to be expressly noted that at no stage in the operation, whether the compartments 20, 22 be inflated or deflated, is there any possibility for the unit to move beyond its illustrated position of insertion because of the engagement of the shoulder 24 between the two compartments 20, 22 with the shoulder at the bell end B of the lateral pipe section of the Y connection.

Obviously, the unit can be constructed in widely variant dimensions to meet the requirements of the particular installation, and can also change in its structural details and manner of fabrication without departing from the spirit of the present invention. Accordingly, the foregoing description of one embodiment of the invention is to be considered purely as exemplary and not in a limiting sense, and the actual scope of the invention is indicated only by reference to the appended claim.

What is claimed is:

A test plug for sealing connecting pipes such as Y's or the like which comprises:
- a generally prolate body including
- a first substantially constant diameter portion having a first expansible chamber therewithin,
- a second substantially constant diameter portion of lesser diameter than said first portion and having a separate second expansible chamber therewithin,
- means forming a rigid shoulder between said first and second portions, and
- separate means for inflating said first and second expansible chambers.

References Cited by the Examiner
UNITED STATES PATENTS

| | | | |
|---|---|---|---|
| 1,795,848 | 3/1931 | Drees | 138—93 |
| 2,299,116 | 10/1942 | Svirsky | 138—90 |
| 3,120,859 | 2/1964 | Wakley | 138—93 |

LAVERNE D. GEIGER, *Primary Examiner.*

LEWIS J. LENNY, *Examiner.*